April 22, 1947.  J. J. NEFF  2,419,461
ELECTRONIC GAUGE FOR MEASURING BALL BEARING INNER RACE GROOVES
Filed Sept. 15, 1945
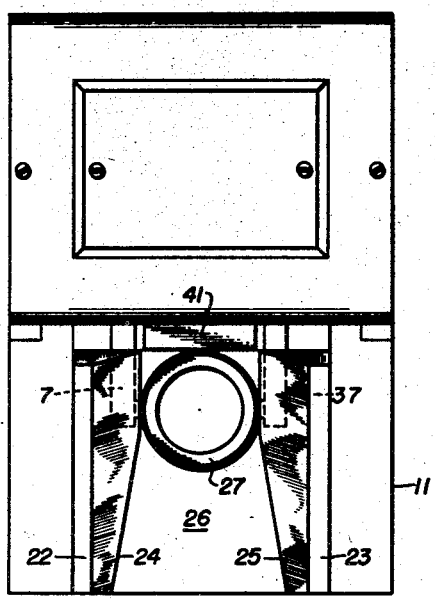
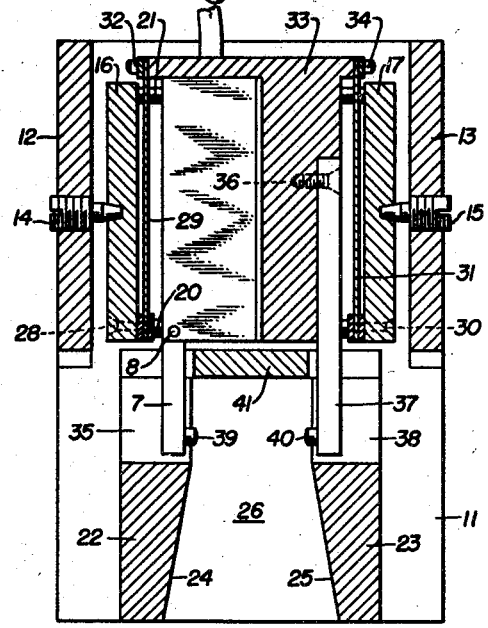
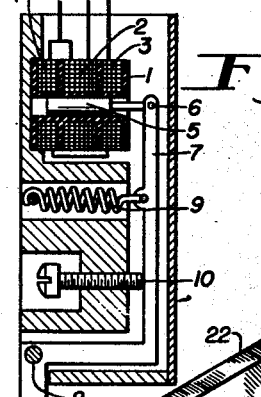
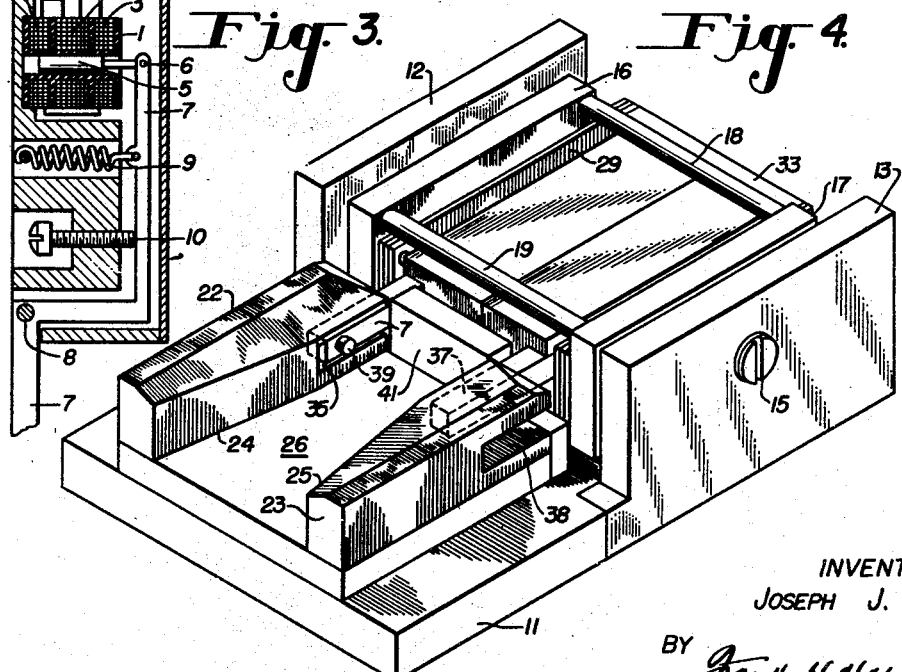
INVENTOR
JOSEPH J. NEFF
BY Frank H. Harmon
ATTORNEY Patented Apr. 22, 1947

2,419,461

UNITED STATES PATENT OFFICE 2,419,461

ELECTRONIC GAUGE FOR MEASURING BALL-BEARING INNER RACE GROOVES

Joseph J. Neff, South Euclid, Ohio, assignor, by mesne assignments, to Jack & Heintz Precision Industries, Inc., Cleveland, Ohio, a corporation of Delaware Application September 15, 1945, Serial No. 616,499

4 Claims. (Cl. 33—148)

1

This invention relates in general to precision gauges and has for one of its primary objects to provide an electronic gauge for measuring and checking the bearing seat of an anti-friction bearing assembly inner race.

Another object is in the employment of a displacement pickup having its armature operated by a work engaging stylus, a simple, efficient and foolproof means for supporting and centering the work with respect to the stylus and displacement pickup so as to insure proper engagement and measurement of the work.

With the foregoing and other objects in view the invention resides in the combination of parts and in the details of construction set forth in the following description and appended claims, certain embodiments thereof being illustrated in the accompanying drawings in which:

Figure 1 is a top plan of the bearing inner race, its supporting means and the outer casing of the displacement pickup unit;

Figure 2 is a view in longitudinal section therethrough with the race removed;

Figure 3 is an enlarged detail view in longitudinal section through the displacement pickup device; and Figure 4 is a view in perspective of the measuring device.

Referring more particularly to the drawings, the same general type of vacuum tube oscillator, electronic voltmeter and displacement pickup unit as those shown in the United States Patent to Joseph J. Neff, No. 2,361,788, October 31, 1944, for Displacement pickup may be used in the present invention. As shown in Figure 3, the displacement pickup unit includes a coil form 1, a driving coil 2, a pickup coil 3 on one side and another pickup coil 4 on the other side of the driving coil, the windings of the three coils being coaxial. An armature 5 is centrally mounted for longitudinal movement through the coils and is pivotally connected at 6 to a stylus arm 7 which is mounted for pivotal movement about an axis 8. The stylus arm is resiliently urged in a counterclockwise direction about its pivot by a tension coil spring 9 and an adjustable screw bolt 10 acts as a limit stop for such counterclockwise movement of the stylus arm.

The base 11 has a pair of spaced side walls 12 and 13 to receive a pair of adjustable pivots 14 and 15 for pivotally supporting a frame having side walls 16 and 17 which are held together by a pair of transverse upper rods 18 and 19 and lower rods 20 and 21, the pivotal movement being limited to a relatively small movement.

2

Also rigid with the base are two uprights 22 and 23 with inwardly levelled inner edges 24 and 25, which together with the intervening platform 26 form a guideway for the inner ball bearing race 27. Secured to the inner face near the forward end of wall 16 at 28 is a leaf spring 29 and near the forward end of wall 17 at 30 is secured a similar leaf spring 31. The other end of leaf spring 29 is connected at 32 to a frame 33 which carries the displacement pickup unit and this frame 33 is also connected at 34 to the corresponding rear end of leaf spring 31. Wall 22 is provided with a through transverse slot 35 to permit movement of the stylus arm 7 therethrough. Rigidly connected at 36 to the other side of frame 33 is an arm 37 that is free to move in a through transverse slot 38 in wall 23. Stylus arm 7 carries a work engaging point 39 on its inner side and arm 37 carries a work engaging point 40 on its inner side.

In the operation of the device, the ball bearing assembly inner race 27 is laid flat on platform 26 and slid forward into abutment against a centering stop 41 in the position shown in Figure 1 where the stylus point 39 and the point 40 of rigid arm 37 engage the outer groove of inner race 27.

The fact that walls 16 and 17 are rotatably pivotally mounted on transverse pivots 14 and 15 insures proper alignment of the outer groove of the inner race with respect to the transverse axis as defined by pivots 14 and 15. Moreover the frame 33 carrying the displacement pickup unit, the pivoted stylus arm 7 and rigid arm 37 is mounted to be floating with respect to walls 16 and 17 by means of leaf springs 29 and 31 which permits stylus point 39 and point 40 of rigid arm 37 to shift laterally to be self-centering with respect to the outer groove of the inner race 27. This insures the maintaining of point 40 hard against the race groove at all times for proper measurement by the stylus.

As is the case in the previously mentioned patent, measurement by the instrument is dependent upon the position of the armature 5 within coils 2, 3 and 4. When the driving coil receives a signal from a suitable vacuum tube oscillator, opposing induced voltages are set up in pickup coils 3 and 4. When the armature is in the electrical center of the three coaxial coils the opposing voltages in the pickup coils exactly counterbalance each other and no indication will be given on a suitable type of electronic voltmeter as shown in the above patent. However, if by engagement of the stylus point 39 with the outer groove of the inner ball race 27 the stylus 7 is caused to pivot, the armature is accordingly displaced from its electrical center. More voltage will then be induced in one pickup coil than in the other, resulting in a corresponding reading on the dial of the electronic voltmeter.

I claim:

1. A precision electronic gauge for measuring and checking the outer groove of an inner ball bearing race comprising a base, a frame mounted on transverse pivots in said base, a housing and resilient means for connecting said housing to said frame in a manner to permit limited relative floating movement of said housing with respect to said frame, an electrical displacement pickup unit including coils and an armature carried by said housing, a rigid work engaging member also carried by said housing, a pair of walls and a work platform therebetween on said base, a pivoted stylus arm on said armature having a work engaging stylus point, the outer groove of said ball race being engaged by said stylus point and maintained hard against a point on said rigid arm as said frame is free to float laterally on said resilient means and rotatably about its transverse axis.

2. A precision electronic gauge for measuring and checking the outer groove of an inner ball bearing race comprising a base, a frame mounted on transverse pivots in said base, a housing and resilient means for connecting said housing to said frame for permitting limited relative floating movement of said housing with respect to said frame, an electrical displacement pickup unit carried by said housing, a rigid work engaging member also carried by said housing, a pivoted stylus arm having a work engaging stylus point, the outer groove of said ball race being engaged by said stylus point and maintained hard against a point on said rigid arm as said frame is free to float laterally on said resilient means and rotatably about its transverse axis, said displacement pickup comprising a driving coil and a pickup coil on either side thereof, the windings of said coils being coaxial, and an armature carried by said pivoted stylus and centrally mounted within said coils for longitudinal movement therein.

3. A precision electronic gauge for measuring and checking the outer groove of an inner ball bearing race comprising a base having a pair of spaced uprights, a frame transversely pivoted thereon, a housing connected to said frame through a pair of leaf springs for permitting limited relative floating movement of said housing with respect to said frame, an electrical displacement pickup unit including coils and an armature carried by said housing, a rigid work engaging member also carried by said housing, a pair of walls and a work platform therebetween on said base, a pivoted stylus arm on said armature having a work engaging stylus point, the outer groove of said ball race being engaged by a point on said stylus arm and maintained hard against a point on said rigid arm as said frame is free to float laterally on said leaf springs and rotatably about said transverse pivots.

4. A precision electronic gauge for measuring and checking the outer groove of an inner ball bearing race comprising a base having a pair of spaced uprights, a frame transversely pivoted thereon, a housing connected to said frame through a pair of leaf springs for permitting limited relative floating movement of said housing with respect to said frame, an electrical displacement pickup unit including coils and an armature carried by said housing, a rigid work engaging member also carried by said housing, a pair of walls and a work platform therebetween on said base, a pivoted stylus arm on said armature having a work engaging stylus point, transverse through slots in said walls for said stylus arms and rigid arms, said walls converging to form a guide for said ball race to be engaged by a point on said stylus arm and maintained hard against a point on said rigid arm as said frame is free to float laterally on said leaf springs and rotatably about said transverse pivots.

JOSEPH J. NEFF.

REFERENCES CITED

The following references are of record in the file of this patent:

UNITED STATES PATENTS

| Number | Name | Date |
|---|---|---|
| 2,189,775 | Bleakney | Feb. 13, 1940 |
| 2,249,477 | Kuehni | July 15, 1941 |
| 2,397,796 | Neff | Mar. 26, 1946 |
| 2,065,951 | Terry | Dec. 29, 1936 |